United States Patent
Ellis et al.

(10) Patent No.: US 11,054,938 B2
(45) Date of Patent: *Jul. 6, 2021

(54) PROVIDING A BASELINE CAPACITANCE FOR A CAPACITANCE SENSING CHANNEL

(71) Applicant: Cypress Semiconductor Corporation, San Jose, CA (US)

(72) Inventors: Denis Ellis, Cobh (IE); Kaveh Hosseini, Cork (IE); Timothy John Williams, Bellevue, WA (US); Gabriel Rowe, Kirkland, WA (US); Roman Ogirko, Lviv (UA); Brendan Lawton, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,798

(22) Filed: Jul. 26, 2017

(65) Prior Publication Data
US 2017/0371451 A1  Dec. 28, 2017

Related U.S. Application Data

(63) Continuation of application No. 14/670,345, filed on Mar. 26, 2015, now Pat. No. 9,746,974.
(Continued)

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC .............. G06F 3/0416; G06F 3/044; G06F 2203/04101
See application file for complete search history.

(56) References Cited

U.S. PATENT DOCUMENTS 7,019,551 B1 * 3/2006 Biesterfeldt ......... H03K 17/163
  326/27
7,277,817 B2 * 10/2007 Hall ..................... G01D 5/2405
  702/150

(Continued)

OTHER PUBLICATIONS

USPTO Final Rejection for U.S. Appl. No. 14/752,687 dated Apr. 30, 2018; 32 pages.
(Continued)

*Primary Examiner* — Michael J Jansen, II

(57) ABSTRACT

A capacitance-sensing circuit may include a channel input associated with measuring a capacitance of a unit cell of a capacitive sense array. The capacitance-sensing circuit may also include a capacitive hardware baseliner that is coupled to the channel input. The capacitive hardware baseliner includes a programmable baseline resistor, and a buffer with an input coupled to the programmable baseline resistor and an output coupled to the channel input. The capacitive hardware baseliner generates a baseline current based on a time constant of the channel input associated with the measuring of the capacitance of the element of the capacitive sense array using the programmable baseline resistor. The capacitive hardware baseliner provides the baseline current at the channel input to provide a charge for a sense capacitor. A change in the charge of the sense capacitor is provided by the baseline current indicating a presence of a touch object proximate to the element.

16 Claims, 13 Drawing Sheets

Related U.S. Application Data

(60) Provisional application No. 62/040,120, filed on Aug. 21, 2014.

(56) References Cited

U.S. PATENT DOCUMENTS

| | | | | |
|---|---|---|---|---|
| 7,663,611 B2* | | 2/2010 | Fagard | G06F 3/0412 345/174 |
| 7,843,249 B2* | | 11/2010 | Zhang | H03K 17/962 324/658 |
| 8,026,904 B2* | | 9/2011 | Westerman | G06F 3/0416 178/18.01 |
| 8,054,296 B2* | | 11/2011 | Land | G06F 3/0418 178/18.01 |
| 8,058,937 B2* | | 11/2011 | Qin | G06F 3/03547 178/18.06 |
| 8,068,097 B2* | | 11/2011 | GuangHai | G06F 3/0227 345/168 |
| 8,089,383 B2* | | 1/2012 | Williams | H03M 1/005 341/136 |
| 8,093,914 B2* | | 1/2012 | Maharyta | G01R 27/2605 324/684 |
| 8,111,243 B2* | | 2/2012 | Peng | G06F 3/044 345/173 |
| 8,120,584 B2* | | 2/2012 | Grivna | G06F 3/016 345/169 |
| 8,144,125 B2* | | 3/2012 | Peng | G06F 3/044 178/18.01 |
| 8,144,126 B2* | | 3/2012 | Wright | G06F 1/3203 178/18.03 |
| 8,154,310 B1* | | 4/2012 | Maharyta | G06F 3/0416 324/678 |
| 8,248,081 B2* | | 8/2012 | Maharyta | G06F 3/03547 324/601 |
| 8,258,797 B2* | | 9/2012 | Shahparnia | G01D 3/08 324/659 |
| 8,446,158 B1* | | 5/2013 | Jansson | H03K 17/9622 324/601 |
| 8,487,639 B1* | | 7/2013 | Walsh | G06F 3/044 324/658 |
| 8,493,356 B2* | | 7/2013 | Joharapurkar | G06F 3/0418 178/18.01 |
| 8,537,119 B1* | | 9/2013 | Grivna | G06F 3/016 345/169 |
| 8,570,053 B1* | | 10/2013 | Ryshtun | H03K 17/962 324/678 |
| 8,599,167 B2* | | 12/2013 | Joharapurkar | G06F 3/0418 178/18.01 |
| 8,610,443 B1* | | 12/2013 | Ryshtun | G06F 3/03545 324/658 |
| 8,614,693 B2* | | 12/2013 | King | G06F 3/0416 178/18.06 |
| 8,711,120 B2* | | 4/2014 | Hargreaves | G06F 3/045 178/18.08 |
| 8,717,302 B1* | | 5/2014 | Qin | G06F 3/044 178/18.06 |
| 8,729,913 B2* | | 5/2014 | Maharyta | G06F 3/044 324/658 |
| 8,766,939 B2* | | 7/2014 | Sobel | G06F 3/044 178/18.06 |
| 8,786,295 B2* | | 7/2014 | Chandra | G06F 3/044 324/686 |
| 8,803,813 B2* | | 8/2014 | XiaoPing | G06F 1/32 178/18.01 |
| 8,816,984 B2* | | 8/2014 | Hotelling | G06F 3/0418 345/173 |
| 8,860,432 B2* | | 10/2014 | Shen | G06F 3/044 324/613 |
| 8,866,494 B2* | | 10/2014 | Ryshtun | G06F 3/03545 324/616 |
| 8,866,500 B2* | | 10/2014 | Kremin | G01R 27/2605 324/658 |
| 8,902,172 B2* | | 12/2014 | Peng | G06F 3/0416 345/173 |
| 8,947,373 B2* | | 2/2015 | Kremin | G06F 3/0418 345/173 |
| 9,069,405 B2* | | 6/2015 | Grivna | G06F 1/3262 |
| 9,154,160 B2* | | 10/2015 | Kremin | G06F 3/044 |
| 9,268,441 B2* | | 2/2016 | Walsh | G06F 3/0416 |
| 9,377,907 B2* | | 6/2016 | Shahparnia | G06F 3/0418 |
| 9,430,105 B2* | | 8/2016 | Yao | G06F 3/044 |
| 9,547,394 B2* | | 1/2017 | Hotelling | G06F 3/044 |
| 9,658,722 B2* | | 5/2017 | Schwartz | G06F 3/044 |
| 9,746,974 B2* | | 8/2017 | Ellis | G06F 3/044 |
| 9,766,749 B2* | | 9/2017 | Pan | G06F 3/0418 |
| 9,857,921 B2* | | 1/2018 | Pant | G06F 3/0418 |
| 9,965,108 B2* | | 5/2018 | Li | G06F 3/044 |
| 10,061,444 B2* | | 8/2018 | Shahparnia | G06F 1/3262 |
| 10,068,121 B2* | | 9/2018 | Kremin | G06K 9/0002 |
| 10,147,382 B2* | | 12/2018 | Nakanishi | G06F 3/044 |
| 10,429,998 B2* | | 10/2019 | Ogirko | G06F 3/044 |
| 2005/0109125 A1* | | 5/2005 | Hall | G01D 5/2405 73/862.68 |
| 2006/0125717 A1* | | 6/2006 | Fagard | G06F 3/0412 345/55 |
| 2006/0138574 A1* | | 6/2006 | Saito | G01L 1/146 257/417 |
| 2007/0229466 A1* | | 10/2007 | Peng | G06F 3/044 345/173 |
| 2007/0229468 A1* | | 10/2007 | Peng | G06F 3/044 345/173 |
| 2007/0262962 A1* | | 11/2007 | XiaoPing | G06F 1/32 345/173 |
| 2007/0262963 A1* | | 11/2007 | Xiao-Ping | G06F 3/03547 345/173 |
| 2007/0296709 A1* | | 12/2007 | GuangHai | G06F 3/0227 345/173 |
| 2008/0036473 A1* | | 2/2008 | Jansson | G06F 3/03547 324/678 |
| 2008/0047764 A1* | | 2/2008 | Lee | G08C 21/00 178/18.06 |
| 2008/0088594 A1* | | 4/2008 | Liu | G06F 3/044 345/173 |
| 2008/0136792 A1* | | 6/2008 | Peng | G06F 3/0416 345/174 |
| 2008/0150905 A1* | | 6/2008 | Grivna | G06F 3/016 345/173 |
| 2008/0158174 A1* | | 7/2008 | Land | G06F 3/0418 345/173 |
| 2008/0158182 A1* | | 7/2008 | Westerman | G06F 3/0416 345/173 |
| 2008/0179112 A1* | | 7/2008 | Qin | G06F 3/03547 178/18.06 |
| 2008/0196945 A1* | | 8/2008 | Konstas | G06F 3/03547 178/18.03 |
| 2008/0277171 A1* | | 11/2008 | Wright | G06F 1/3203 178/18.06 |
| 2009/0008161 A1* | | 1/2009 | Jones | G06F 3/044 178/18.06 |
| 2009/0066674 A1* | | 3/2009 | Maharyta | G06F 3/03547 345/178 |
| 2009/0108914 A1* | | 4/2009 | Zhang | H03K 17/962 327/517 |
| 2009/0153152 A1* | | 6/2009 | Maharyta | G01R 27/2605 324/684 |
| 2009/0315850 A1* | | 12/2009 | Hotelling | G06F 3/044 345/173 |
| 2009/0315851 A1* | | 12/2009 | Hotelling | G06F 3/044 345/173 |
| 2010/0031205 A1* | | 2/2010 | Chang | G06F 30/36 716/100 |
| 2010/0283647 A1* | | 11/2010 | Williams | H03M 1/005 341/135 |
| 2010/0327882 A1* | | 12/2010 | Shahparnia | G01D 3/08 324/659 |
| 2011/0025629 A1* | | 2/2011 | Grivna | G06F 3/0416 345/173 |

(56) References Cited

U.S. PATENT DOCUMENTS

| | | | | |
|---|---|---|---|---|
| 2011/0115729 A1* | 5/2011 | Kremin | G06F 3/0418 | 345/173 |
| 2011/0261005 A1* | 10/2011 | Joharapurkar | G06F 3/0418 | 345/174 |
| 2011/0261007 A1* | 10/2011 | Joharapurkar | G06F 3/0418 | 345/174 |
| 2012/0043970 A1* | 2/2012 | Olson | G01R 27/2605 | 324/601 |
| 2012/0043973 A1* | 2/2012 | Kremin | G06F 3/044 | 324/658 |
| 2012/0049868 A1* | 3/2012 | Maharyta | G06F 3/044 | 324/679 |
| 2012/0050210 A1* | 3/2012 | King | G06F 3/0416 | 345/174 |
| 2012/0217978 A1* | 8/2012 | Shen | G06F 3/0418 | 324/601 |
| 2012/0256868 A1* | 10/2012 | Choi | G06F 3/0416 | 345/174 |
| 2012/0256869 A1* | 10/2012 | Walsh | G06F 3/0416 | 345/174 |
| 2012/0268145 A1* | 10/2012 | Chandra | G06F 3/044 | 324/686 |
| 2012/0286800 A1* | 11/2012 | Maharyta | G06F 3/0416 | 324/603 |
| 2012/0287077 A1* | 11/2012 | Pant | G06F 3/0418 | 345/174 |
| 2012/0293447 A1* | 11/2012 | Heng | G06F 3/044 | 345/174 |
| 2012/0319996 A1* | 12/2012 | Hotelling | G06F 3/044 | 345/174 |
| 2013/0176269 A1* | 7/2013 | Sobel | G06F 3/044 | 345/174 |
| 2013/0314109 A1* | 11/2013 | Kremin | G01R 27/2605 | 324/686 |
| 2014/0015746 A1* | 1/2014 | Hargreaves | G06F 3/044 | 345/157 |
| 2014/0085246 A1* | 3/2014 | Shahparnia | G06F 3/044 | 345/174 |
| 2014/0267151 A1* | 9/2014 | Ryshtun | G06F 3/03545 | 345/174 |
| 2014/0375600 A1* | 12/2014 | Pan | G06F 3/0418 | 345/174 |
| 2015/0035787 A1* | 2/2015 | Shahparnia | G06F 3/044 | 345/174 |
| 2015/0084876 A1* | 3/2015 | Schwartz | G06F 3/0418 | 345/173 |
| 2015/0227232 A1* | 8/2015 | Yao | G06F 3/044 | 345/174 |
| 2015/0235607 A1* | 8/2015 | Nakanishi | G09G 3/3696 | 345/174 |
| 2015/0331535 A1* | 11/2015 | Li | G06F 3/044 | 348/174 |
| 2016/0026295 A1* | 1/2016 | Ogirko | G06F 3/0416 | 345/174 |
| 2016/0054829 A1* | 2/2016 | Ellis | G06F 3/044 | 345/178 |
| 2016/0117017 A1* | 4/2016 | Kremin | G01R 27/2605 | 345/174 |
| 2016/0357288 A1* | 12/2016 | Chao | G06F 3/044 | |
| 2017/0061188 A1* | 3/2017 | Kremin | G06F 3/044 | |
| 2017/0371444 A9* | 12/2017 | Chao | G06F 3/044 | |

OTHER PUBLICATIONS

USPTO Non-Final Rejection for U.S. Appl. No. 14/752,687 dated Aug. 30, 2018; 28 pages.

USPTO Notice of Allowance for U.S. Appl. No. 14/752,687 dated Apr. 17, 2019; 8 pages.

USPTO Applicant Initiated Interview Summary for U.S. Appl. No. 14/752,687 dated Nov. 7, 2015; 6 pages.

USPTO Final Rejection for U.S. Appl. No. 14/752,687 dated Jan. 30, 2019; 19 pages.

* cited by examiner

PROVIDING A BASELINE CAPACITANCE FOR A CAPACITANCE SENSING CHANNEL

RELATED APPLICATIONS

This application is a continuation of U.S. application Ser. No. 14/670,345, filed Mar. 26, 2015, which claims the benefit of U.S. Provisional Application No. 62/040,120, filed Aug. 21, 2014, the entire contents of which are hereby incorporated by reference herein in their entirety.

TECHNICAL FIELD

The present disclosure generally relates to sensing systems, and more particularly to providing a baseline capacitance for a capacitive sensing channel.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and other such devices. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground.

BRIEF DESCRIPTION OF THE DRAWINGS

The present disclosure is illustrated by way of example, and not of limitation, in the figures of the accompanying drawings.

DETAILED DESCRIPTION

Figure 1:
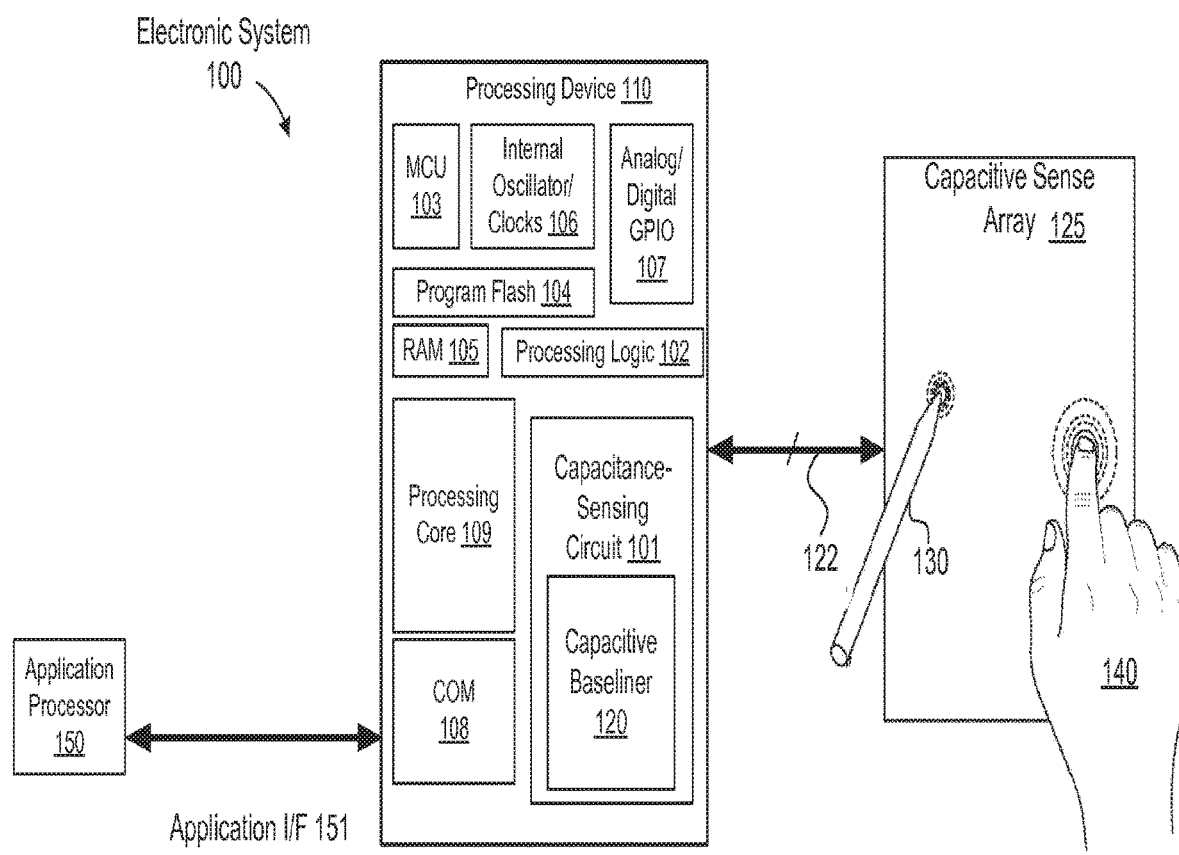
FIG. 1 is a block diagram illustrating an electronic system having a processing device that includes a capacitive baseliner in accordance with some embodiments of the present disclosure.

Aspects of the present disclosure relate to providing a baseline capacitance for a capacitive sense channel associated with a capacitive sense array. A baseline capacitance may be used by the capacitive sense channel for touch detection. For example, the baseline capacitance may represent a capacitance when no touch object is present at a corresponding sense channel associated with a unit cell of the capacitive sense array. The baseline capacitance may be compared to a subsequently measured capacitance value to determine if a touch object is present at the unit cell associated with the corresponding sense channel. For example, a change or difference between the subsequently measured capacitance value and the value of the baseline capacitance may indicate the presence of a touch object at the unit cell of the capacitive sense array.

A current or charge may provide the baseline capacitance. For example, a current may be used to provide a baseline capacitance. If the current or charge is provided by the sense channel (e.g., the front end of a receive, or RX, sense channel associated with a capacitive sense array), then the noise associated to the baseline current or charge enters the sense channel resulting in increased noise in the sense channel. Furthermore, if the baseline capacitance is to be a large capacitance, then a larger current may require a large attenuation factor in the RX channel to attenuate or reduce the impact of the larger current in the sense channel. However, a large attenuation factor may result in reduced resolution to detect a subsequent touch object by the sense channel since a small change in the current may result in reduced sensitivity to detect the small change after the attenuation factor has been applied.

A capacitive baseliner may be provided so that the current provided for a baseline capacitance does not saturate the front end of a sense channel associated with a capacitive sense array and also does not require an attenuation factor. For example, another circuit (e.g., the capacitive baseliner circuit) as opposed to the front end of the sense channel may provide the current or charge to provide the baseline capacitance. The current may be introduced to the baseline capacitor without entering the front end of the sense channel.

The capacitive baseliner may be implemented with a programmable resistor, a programmable capacitor, and a programmable current gain component to provide a current or charge to a baseline capacitor without introducing significant noise to the sense channel. The programmable capacitor and the programmable resistor may be used by a current buffer to generate a current that may then be amplified based on the current gain component.

As previously described, a capacitive sense array may be associated with multiple sense channels. A single capacitive baseliner may be used to generate a single current or charge to multiple programmable current gain components that each correspond to one of the sense channels. For example, a first current based on a first current gain factor may be provided to for a first baseline capacitance of a first sense channel and a second current based on a second current gain factor may be provided for a second baseline capacitance of a second sense channel. Thus, the capacitive baseliner may be used to provide different currents for different baseline capacitances to be used by different sense channels by using multiple programmable current gain components.

FIG. 1 is a block diagram illustrating one embodiment of an electronic system having a processing device, including a capacitive baseliner. The electronic system may correspond to a capacitive sense array system. Details regarding the capacitive baseliner 120 are described in more detail with respect to FIGS. 3-13. In some embodiments, the capacitive baseliner 120 may be located in the capacitive sense array 125 and/or the capacitive baseliner 120 of the processing device 110 may be used to program components of the capacitive baseliner as described in further detail below. The processing device 110 is configured to detect one or more touches detected proximate to a touch-sensing device, such as capacitive sense array 125. The processing device 110 can detect conductive objects, such as touch objects 140 (fingers or passive styluses, an active stylus 130, or any combination thereof). The capacitance-sensing circuit 101 can measure touch data created by a touch using the capacitive sense array 125. The touch may be detected by a single or multiple sensing cells, each cell representing an isolated sense element or an intersection of sense elements (e.g., electrodes) of the capacitive sense array 125. In one embodiment, when the capacitance-sensing circuit 101 measures mutual capacitance of the touch-sensing device (e.g., using capacitive sense array 125), the capacitance-sensing circuit 101 acquires a 2D capacitive image of the touch-sensing object and processes the data for peaks and positional information. In another embodiment, the processing device 110 is a microcontroller that obtains a capacitance touch signal data set from application processor 150, such as from capacitive sense array 125, and finger detection firmware executing on the microcontroller identifies data set areas that indicate touches, detects and processes peaks, calculates the coordinates, or any combination therefore. The microcontroller can report the precise coordinates to an application processor, as well as other information.

Electronic system 100 includes processing device 110, capacitive sense array 125, stylus 130, and application processor 150. The capacitive sense array 125 may include capacitive sense elements that are electrodes of conductive material, such as copper. The sense elements may also be part of an indium-tin-oxide (ITO) panel. The capacitive sense elements can be used to allow the capacitance-sensing circuit 101 to measure self-capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to other inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 109 to implement operations described herein). Processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 109. In the case of the memory being external to the processing device, the processing device is coupled to the other device in which the memory resides as would be appreciated by one of ordinary skill in the art having the benefit of this disclosure.

In one embodiment, the processing device 110 further includes processing logic 102. Some or all of the operations of the processing logic 102 may be implemented in firmware, hardware, or software or some combination thereof. The processing logic 102 may receive signals from the capacitance-sensing circuit 101, and determine the state of the capacitive sense array 125, such as whether an object (e.g., a finger) is detected on or in proximity to the capacitive sense array 125 (e.g., determining the presence of the object), resolve where the object is on the sense array (e.g., determining the location of the object), tracking the motion of the object, or other information related to an object detected at the touch sensor. In another embodiment, processing logic 102 may include capacitance-sensing circuit 101. In another embodiment, processing logic 102 may perform some or all the functions of capacitance-sensing circuit 101 and/or processing device 110.

The processing device 110 may also include an analog block array (not shown) (e.g., field-programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge-coupling techniques, charge balancing techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the transmit (TX) and receive (RX) electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the capacitive baseliner 120. In addition, the capacitive baseliner 120 may be used in conjunction with various components to program or control capacitance, current gain, and resistance values to provide a baseline current for a baseline capacitor. Additional details of the capacitive baseliner 120 are described below with respect to FIGS. 3-13. The capacitive baseliner may be implemented on or off chip.

Processing device 110 may include internal oscillator/clocks 106 and communication block ("COM") 108. In another embodiment, the processing device 110 includes a spread-spectrum clock (not shown). The oscillator/clocks block 106 provides clock signals to one or more of the components of processing device 110. Communication block 108 may be used to communicate with an external component, such as an application processor 150, via application interface ("I/F") line 151.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the capacitance on the sensing device and sends the raw data to a host computer where it is analyzed by an application. In effect, the processing that is done by processing device 110 may also be done in the application processor.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2:
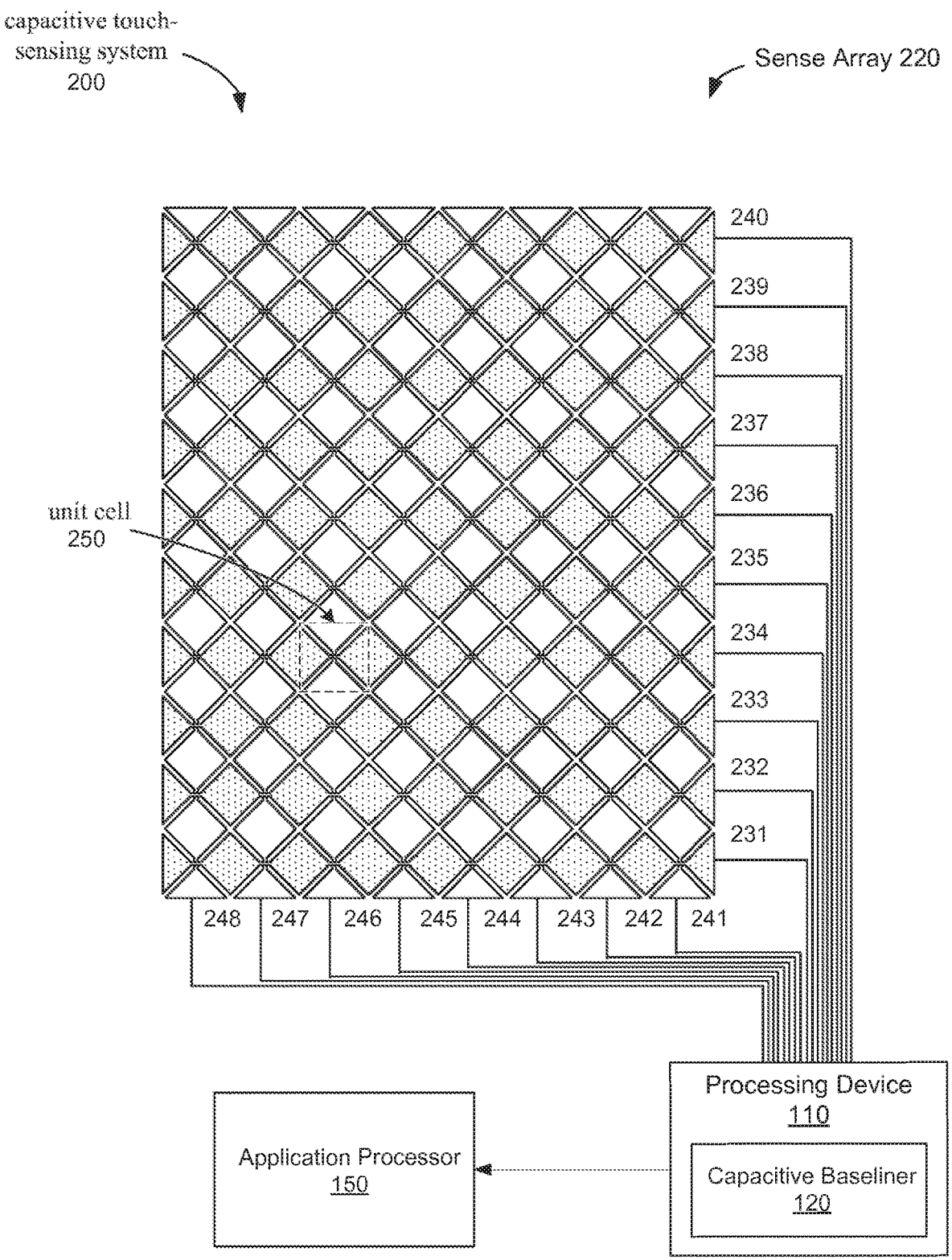
FIG. 2 illustrates a capacitive touch sensing system in accordance with some embodiments.

FIG. 2 illustrates a capacitive touch-sensing system, according to one embodiment. Capacitive touch-sensing system 200 includes a sense array 220. Sense array 220 may be a capacitive sense array. Sense array 220 includes multiple row electrodes 231-240 and multiple column electrodes 241-248. The row and column electrodes 231-248 are connected to a processing device 110, which may include the functionality of capacitance-sensing circuit 101, as illustrated in FIG. 1. In one embodiment, the processing device 110 may perform mutual capacitance measurement scans and/or self capacitance measurement scans of the sense array 220 to measure a mutual capacitance value or a self capacitance value associated with each of the intersections between a row electrode and a column electrode in the sense array 220. The measured capacitances may be further processed to determine centroid locations of one or more contacts of conductive objects proximate to the sense array 220.

In one embodiment, the processing device 110 is connected to an application processor 150 which may receive the measured capacitances or calculated centroid locations from the processing device 110.

The sense array 220 illustrated in FIG. 2 includes electrodes arranged to create a pattern of interconnected diamond shapes. Specifically, the electrodes 231-248 of sense array 220 form a single solid diamond (SSD) pattern. In one embodiment, each intersection between a row electrode and a column electrode defines a unit cell. Each point within the unit cell is closer to the associated intersection than to any other intersection. For example, unit cell 250 contains the points that are closest to the intersection between row electrode 234 and column electrode 246. Thus, the unit cell may be considered to include a pair of electrodes, or may alternatively include a single electrode.

In one embodiment, capacitive touch-sensing system 200 may collect data from the entire touch-sensing surface of sense array 220 by performing a scan to measure capacitances of the unit cells that comprise the touch-sensing surface, then process the touch data serially or in parallel with a subsequent scan. For example, one system that processes touch data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In one embodiment, capacitive touch-sensing system 200 may be configured to perform both of self-capacitance sensing and mutual capacitance sensing. In one embodiment, capacitive touch-sensing system 200 is configured to perform self-capacitance sensing, in sequence or in parallel, to measure the self-capacitance of each row and column electrode of the touch-sensing surface (e.g., sense array 220), such that the total number of sense operations is N+M, for a capacitive-sense array having N rows and M columns. In one embodiment, capacitive touch sensing system 200 may be capable of connecting individual electrodes together to be sensed in parallel with a single operation. For example, multiple row (e.g., electrodes 231-240) and or column electrodes (e.g., electrodes 241-248) may be coupled together and sensed in a single operation to determine whether a conductive object is touching or near the touch-sensing surface. In an alternate embodiment, the capacitive touch-sensing system 200 may be capable of connecting each row electrode to it is own sensing circuit such that all row electrodes may be sensed in parallel with a single operation. The capacitive touch-sensing system 200 may also be capable of connecting each column electrode to its own sensing circuit such that all column electrodes may be sensed in parallel with a single operation. The capacitive touch-sensing system 200 may also be capable of connecting all row and column electrodes to their own sensing circuits, such that all row and column electrodes may be sensed in parallel with a single operation.

In one embodiment, the capacitive touch-sensing system 200 may perform mutual capacitance sensing of the touch-sensing surface (e.g., sense array 220) by individually sensing each intersection between a row electrode and a column electrode. Thus, a total number of sense operations for a capacitive-sense array (e.g., sense array 220) having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance-sensing circuits may be used in parallel to measure a signal coupled to multiple column electrodes simultaneously, from a signal applied to one or more row electrodes. In one embodiment, for a capacitive-sense array (e.g., sense array 220) having X rows, Y columns, and N columns that can be sensed simultaneously, the number of mutual capacitance sensing operations is the smallest whole number greater than or equal to X×Y/N.

In one embodiment, each update of the touch locations may include a sensing portion and a non-sensing portion. The sensing portion may include measurement of capacitance associated with intersections between electrodes, while the non-sensing portion may include calculation of touch locations based on the capacitance measurements and reporting of the calculated touch locations to a host device.

In one embodiment, capacitive touch-sensing system 200 includes capacitive baseliner 120. In addition capacitive touch-sensing system 200 may include a programmable resistor, programmable capacitor, a current buffer, and multiple current gain components (not shown) that may be controlled (e.g., configured) by the capacitive baseliner 120. For example, the programmable components and the current buffer may be included in or may be coupled to the sense array 220 and the capacitive baseliner 120 may be used to program the programmable components.

Figure 3:
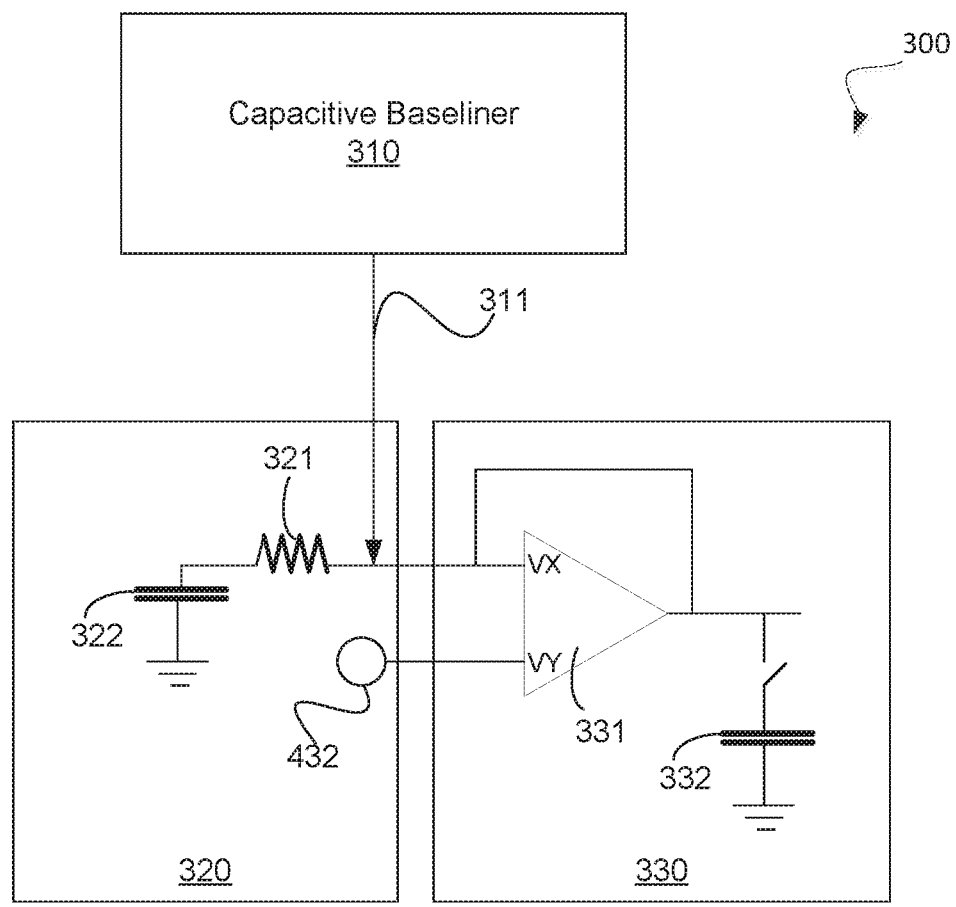
FIG. 3 is a block diagram of a capacitive baseliner and a sense channel in accordance with some embodiments.

FIG. 3 is a block diagram of a capacitive baseliner and a sense channel. In general, the capacitive baseliner 310 may correspond to the capacitive baseliner 120 of FIGS. 1 and 2 and/or may correspond to components that are controlled by the capacitive baseliner 120.

As shown in FIG. 3, a capacitive baseliner 310 (also referred to as a capacitive hardware baseliner or a capacitive baseline circuit) may provide a current 311 (i.e., a baseline current) to a baseline component 320. Furthermore, the baseline component 320 may be coupled to the front end 330 of a sense channel (e.g., an RX sense channel). The capacitive baseliner 310 may generate a current based on characteristics of the sense channel. For example, the current 311 may be generated based on a baseline capacitance that is required by the sense channel.

The baseline component 320 may correspond to a capacitive sense array operating in a self-capacitance mode. For example, the baseline component 320 may include a sense capacitor 322 that operates in a self capacitance mode and a resistor 321. The current 311 provided by the capacitive baseliner 310 may be provided to provide a baseline capacitance (e.g., as represented by the sense capacitor 322) and result in a capacitance stored at the sense capacitor 322. The front end 330 of the sense channel may include an attenuator 331 and an integration capacitor 332. In some embodiments, the attenuator 331 may reduce the input current by an amount referred to as an attenuation factor to generate an output current. Since the current 311 is provided by the capacitive baseliner 310 to provide the capacitance of the sense capacitor 322, the attenuator 331 of the front end 330 may not require a large attenuation factor as the current 311 is introduced by the capacitive baseliner 310 to the sense capacitor 322 and does not enter the front end 330 (e.g., through the attenuator 331).

As a result, the current to provide a charge to the sense capacitor 322 is not provided by sense channel (e.g., the front end 330 or baseline component 320). Instead, a separate circuit that is separate from the sense channel may provide the current to provide the capacitance corresponding to the sense capacitor 322. In some embodiments, the capacitive baseliner 310, baseline component 320, and the front end 330 may be a part of or coupled to a capacitive sense array.

Figure 4:
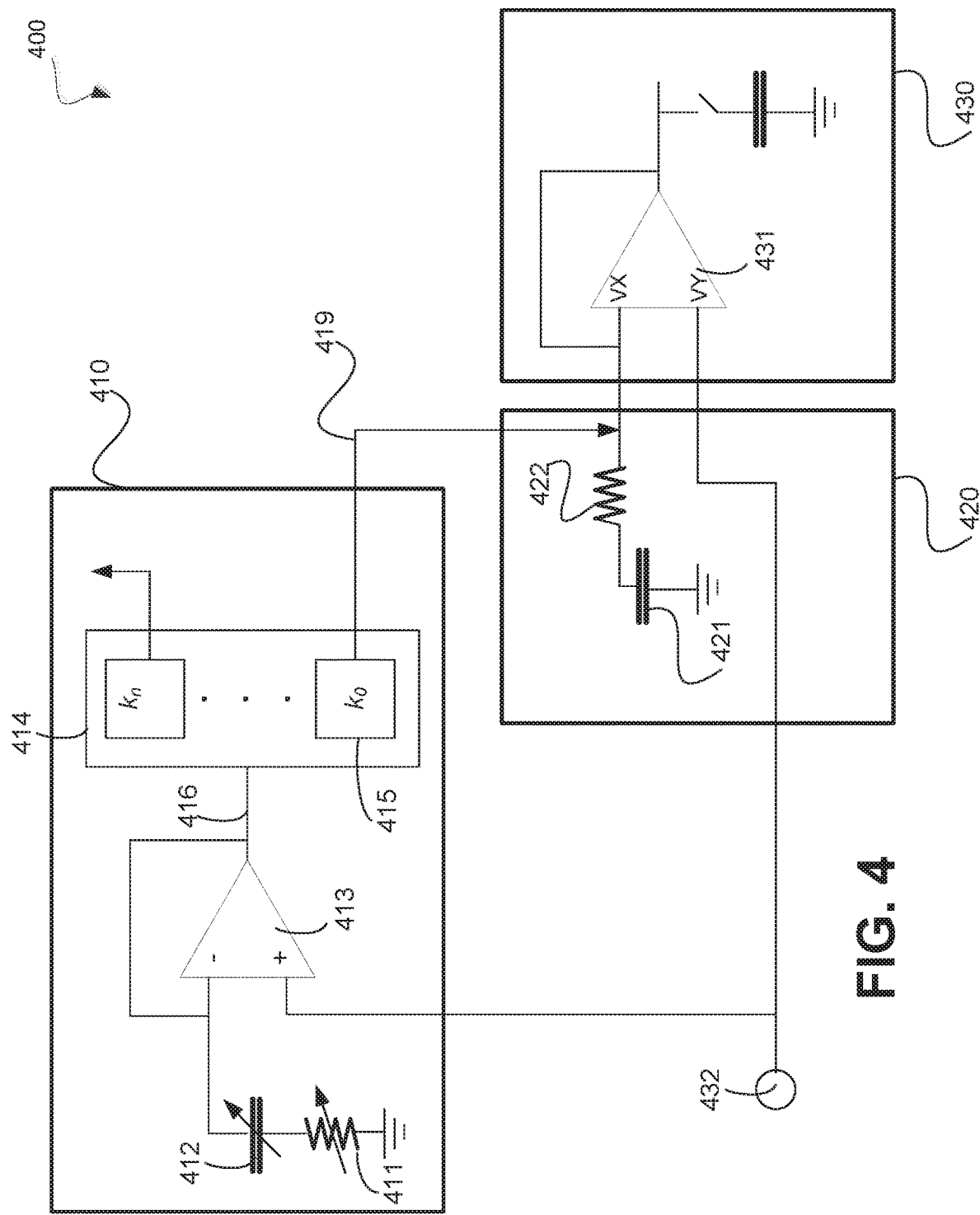
FIG. 4 is a circuit diagram of an architecture including a capacitive baseliner in accordance with some embodiments of the present disclosure.

FIG. 4 is a circuit diagram of an example architecture 400 including a capacitive baseliner. In general, the architecture 400 may include a capacitive baseliner 410 that may correspond to the capacitive baseliner 120 of FIG. 1 or 2 or the capacitive baseliner 310 of FIG. 3.

As shown in FIG. 4, the architecture 400 may include a capacitive baseliner 410 with a baseline component 420 and a front end 430 of a sense channel. In some embodiments, the baseline component 420 and the front end 430 may be part of the sense channel associated with a unit cell of a capacitive sense array and the capacitive baseliner 410 may be separate from the sense channel. The capacitive baseliner 410 may include a programmable (i.e., reconfigurable) baseline capacitor 412, a programmable baseline resistor 411, a current buffer 413, and a current gain stage 414 that includes multiple current gain components including a current gain component 415 for a sense channel that corresponds to the baseline component 420 and the front end 430.

The capacitive baseliner 410 may provide an average current by using the programmable baseline capacitor 412 and the programmable baseline resistor 411 and the current buffer 413 with a negative feedback. The positive input of the current buffer 413 may be coupled to the VY input of the attenuator 431 of the front end 430. In some embodiments, the VY input of the attenuator 431 and the positive input of the current buffer 413 may be driven by a source 432 (e.g., a pin or port) corresponding to an input signal. In a self-capacitance mode, the source 432 may provide a square wave or a repetitive pulse. Thus, the positive input of the current buffer 413 and the VY input of the attenuator 431 receive the same signal or pulse or voltage source. Thus, an input of the capacitive baseliner for the current buffer may be coupled to the same voltage source as an input of the sense channel (e.g., the input of the capacitive baseliner corresponding to the input of the current buffer may be coupled to the same voltage source as a channel input of the sense channel). The current buffer 413 may generate a first current 416 that is received by the current gain stage 414. In some embodiments, the current gain stage 414 may include multiple current gain components 415 where each current gain component is used by or corresponds to a single sense channel. For example, the current gain component 415 may be used to provide a baseline current 419 to provide the baseline capacitance for the sense capacitor 421. In some embodiments, the baseline current 419 is equivalent to $VY \times K_{BLi} \times C_{BL} = VY \times C_s$ where $K_{BLi}$ is equivalent to the current gain factor of the current gain component 415, $C_{BL}$ is the capacitance value of the baseline capacitor 412, and $C_s$ is the capacitance represented by the sense capacitor 421. Furthermore, the current gain component 415 may increase the current or amplitude of the first current 416 by a programmed gain factor to generate the baseline current 419.

Figure 6:
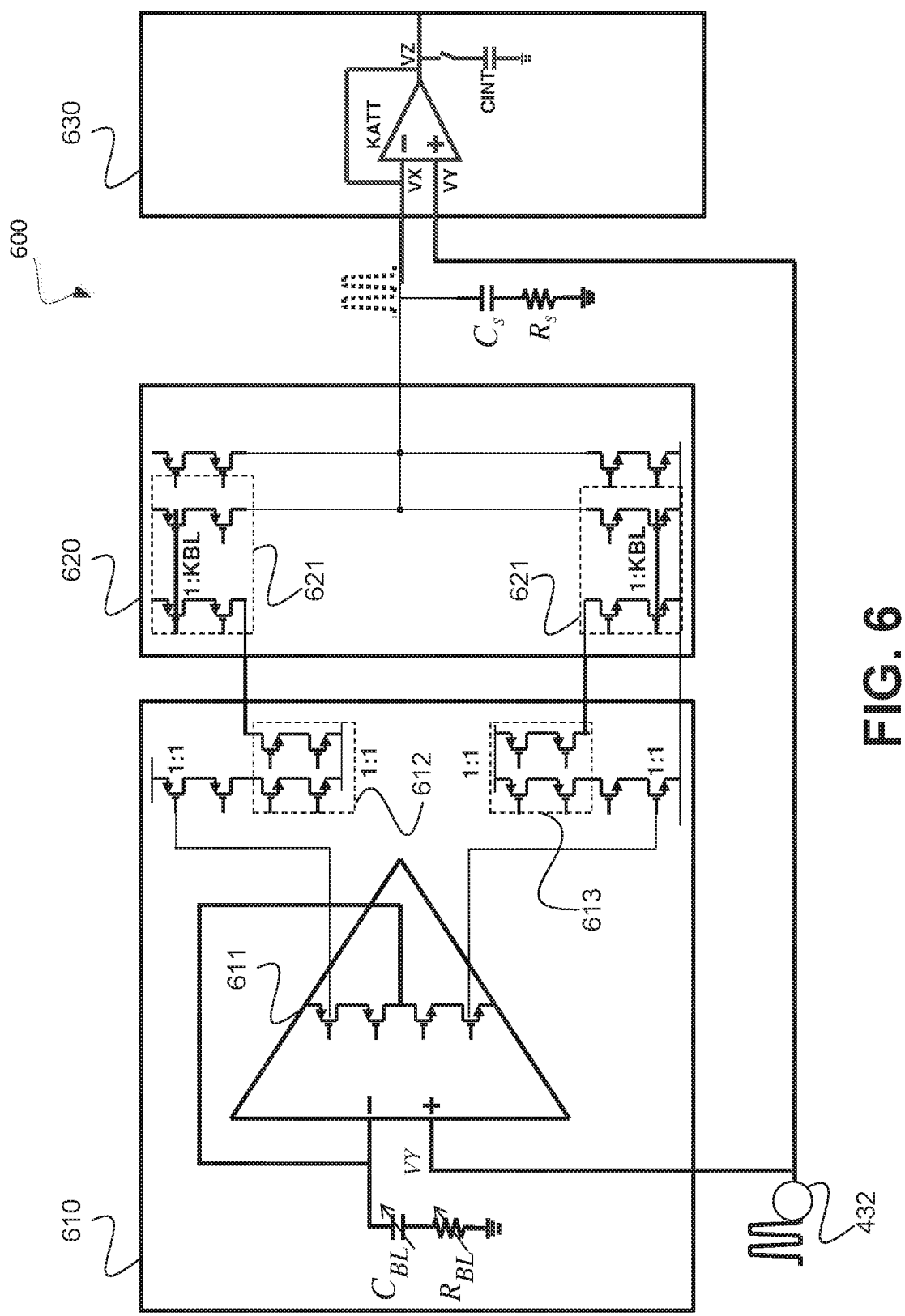
FIG. 6 illustrates an example architecture including a capacitive baseliner in accordance with some embodiments of the present disclosure.

The current gain stage 414 may further include a current mirroring circuit as described in further detail with regard to FIG. 6. For example, the current gain stage 414 may provide current mirroring of the first current 416 to multiple current gain components 415 that are to be used with multiple sense channels. In some embodiments, the programmable baseline resistor 411 and the programmable baseline capacitor 412 may be set or programmed to match a time constant associated with a sense resistor 422 and the sense capacitor 421 of the baseline component 420 of the sense channel. For example, a programmed value of the baseline capacitor 412 (e.g., a capacitance value) and a programmed value of the resistor (e.g., a resistance value) may be used to generate the baseline current.

Figure 5:
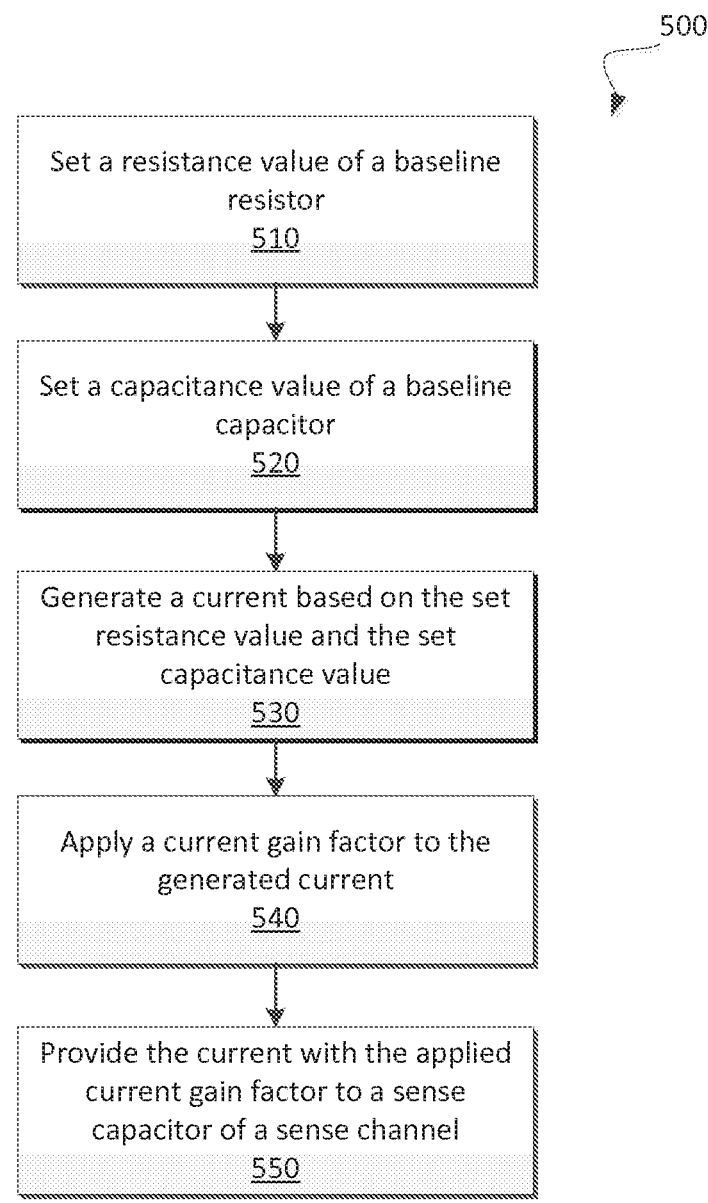
FIG. 5 illustrates an example method to provide a baseline capacitance in accordance with some embodiments.

FIG. 5 illustrates an example method 500 to provide a baseline capacitance. The method 500 may be performed by processing logic that may include hardware (circuitry, dedicated logic, etc.), software (such as is run on a general purpose computing system or a dedicated machine), firmware (embedded software), or any combination thereof. In general, the capacitive baseliner 120, 310, or 410 of FIGS. 1-4 may perform the method 500.

As shown in FIG. 5, the method 500 may begin with the processing logic setting a resistance value of a baseline resistor (block 510). For example, the baseline resistor may be configured to provide a particular resistance. Furthermore, the processing logic may set a capacitance value of a baseline capacitor (block 520). For example, the baseline capacitor may be configured to provide a particular capacitance. In some embodiments, a combination of the capacitance of the baseline capacitor and the resistance of the baseline resistor may match a time constant of a sense capacitor and a sense resistor of a sense channel. The processing logic may further generate a current based on the set resistance value of the baseline resistor and the set capacitance value of the baseline capacitor (block 530). For example, a current may be generated by a current buffer based on a programmed resistance and a programmed capacitance. Furthermore, the processing logic may apply a gain factor to the current that has been generated based on the programmed or set resistance for the baseline resistor and the programmed or set capacitance for the baseline capacitor to generate a baseline current (block 540). For example, the current generated by the current buffer may be modified (e.g., change in amplitude or current) based on the gain factor applied by a current gain component. For example, a gain factor of 10× may amplify the current by a factor of 10. The processing logic may further provide the baseline current generated by the current gain component to the sense capacitor of a sense channel to provide a capacitance at the sense capacitor (block 550).

FIG. 6 illustrates an example architecture 600 including a capacitive baseliner. In general, the architecture 600 may include a baseliner core 610 and a gain stage 620 that corresponds to a capacitive baseliner 120, 310, or 410 of FIGS. 1-4.

As shown in FIG. 6, the architecture 600 may include a baseliner core 610, a gain stage 620, and a front end 630 of a sense channel. The baseliner core 610 may include a current buffer 611 where a negative input of the current buffer 611 is coupled to an output current of the current buffer 611 and a baseline capacitor and a baseline resistor ($R_{BL}$). In some embodiments, the baseline capacitor ($C_{BL}$) may be part of the baseliner core 610 or the baseline capacitor may be an off-chip capacitor as described in further detail with regard to FIG. 12. Furthermore, the positive input of the current buffer may be coupled to a positive input (e.g., VY) of an attenuator of the front end 630 of the sense channel. The baseliner core 610 may further include current mirrors 612 and 613. In some embodiments, a current mirror may copy a current through an active device (e.g., the current buffer) by controlling the current in another active device (e.g., the current mirror) of a circuit, keeping the output current constant regardless of loading. Thus, the current mirrors 612 and 613 may be used to duplicate a current to each different load. The current output from the current buffer 611 may be mirrored a number of times corresponding to a number of sense channels of a capacitive sense array. In some embodiments, the current output that is mirrored may be referred to as a mirrored output current. Thus, the current mirrors 612 and 613 may generate multiple mirrored output currents. Furthermore, the gain stage 620 may include current gain components 621 that apply various current gain factors to the mirrored currents. In some embodiments, the gain stage 620 may further include a PN trim circuit to trim mismatch between a P (Up) and an N (Down) signal or current in the current gain component. The PN trim circuit may allow the P and N signals or currents to match. For example, the P and N currents may be generated in response to the positive and negative edges of an input to the current buffer (e.g., the positive terminal corresponding to the VY signal).

As such, current mirror circuits in the baseliner core may mirror or duplicate the current based on a number of sense channels (e.g., RX sense channels associated with a capacitive sense array) that may receive various baseline currents.

Figure 7:
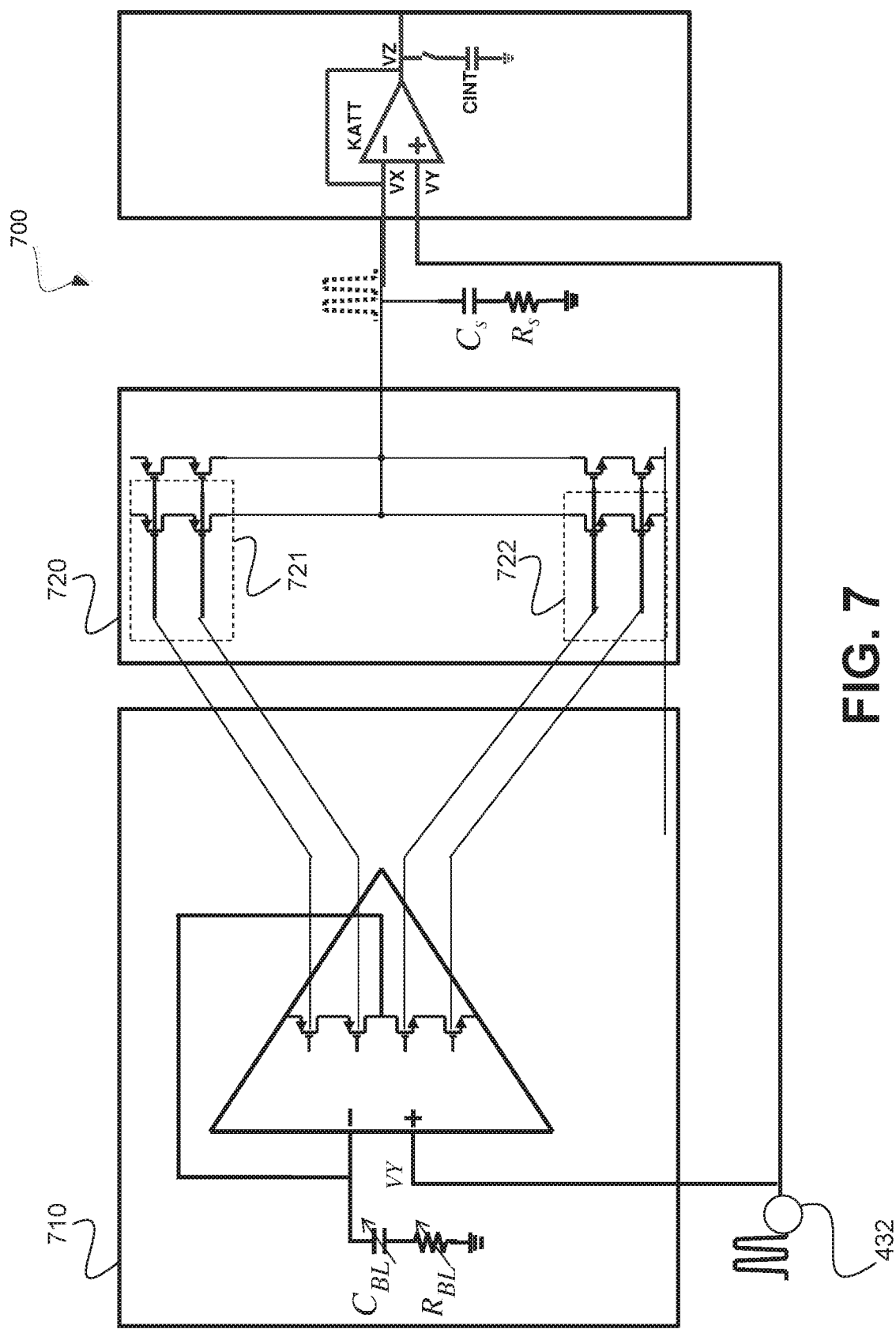
FIG. 7 illustrates another example architecture including a capacitive baseliner in accordance with some embodiments of the present disclosure.

FIG. 7 illustrates another example architecture 700 including a capacitive baseliner. In general, the architecture 700 may include a baseliner core 710 and a gain stage 720 that corresponds to a capacitive baseliner 120, 310, or 410 of FIGS. 1-4.

As shown in FIG. 7, the architecture 700 includes a baseliner core 710 and a gain stage 720. However, the baseliner core 710 does not include the current mirror circuits as described in conjunction with the baseliner core 610 of FIG. 6. Instead, bias voltages are used in the gain stage 720 by the current gain components 721 and 722 to mirror the output current of the current buffer of the baseliner core. In some embodiments, the architecture 700 may provide better PN mismatch and power supply rejection performance as opposed to the architecture 600 that includes the current mirror circuits in the baseliner core.

Figure 8:
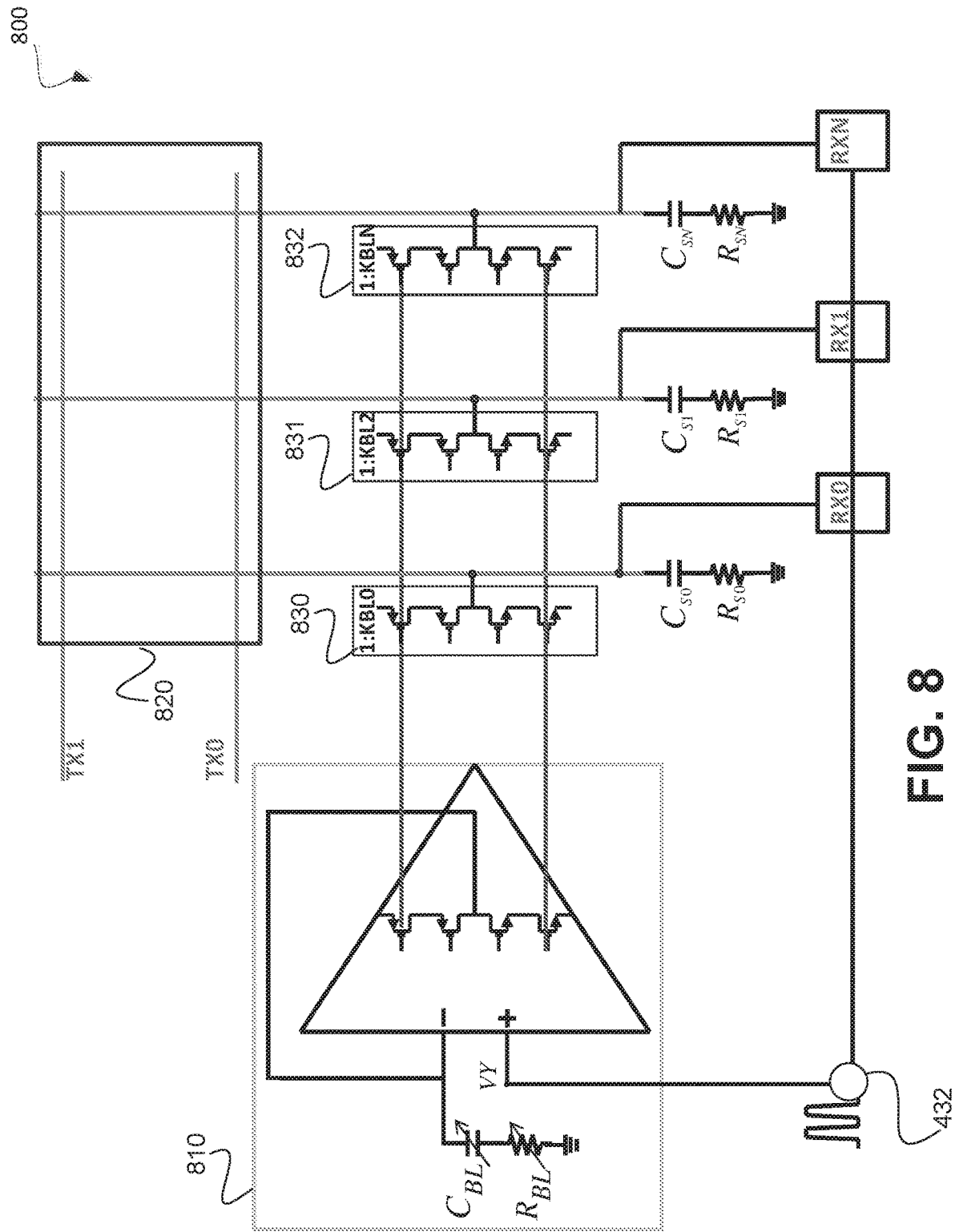
FIG. 8 illustrates an architecture including a capacitive baseliner coupled to multiple sense channels in accordance with some embodiments.

FIG. 8 illustrates an architecture 800 including a capacitive baseliner coupled to multiple sense channels. In general, the architecture 800 may include a capacitive baseliner (e.g., a baseliner core and a gain stage) as described in conjunction with FIGS. 1-4 and 6-7.

As shown in FIG. 8, the architecture 800 may include a single baseliner core 810, current gain components 830, 831, and 832, and a capacitive sense array 820. In some embodiments, the capacitive sense array may be associated with multiple sense channels (e.g., $RX_0$ to $RX_n$). For example, each sense channel may correspond to an intersection between a transmit (TX) electrode and a receive (RX) electrode of the capacitive sense array 820. Each sense channel may further be associated with a current gain component, a sense capacitor, and a sense resistor.

In operation, the baseline capacitor and the baseline resistor of the baseliner core 810 may be used by the current buffer to generate an output current that is received by the current gain components 830, 831, and 832. For example, the output current from the current buffer may be mirrored by current mirror circuits so that a separate and equivalent current is provided to each of the current gain components 830, 831, and 832. For example, the output current from the current buffer is separately provided to each current gain component. In some embodiments, the various sense channels may require different baseline capacitances. For example, variances in the capacitive sense array 820 may require different baseline capacitances for different RX sense channels. A first sense channel (e.g., $RX_0$) may use the current gain component 830 to provide an amplified current for a first capacitance represented by the first sense capacitor ($C_{S0}$). Furthermore, the second sense channel (e.g., $RX_1$) may use the current gain component 831 to provide another amplified current for a second capacitance represented by the second sense capacitor ($C_{S1}$). For example, a first gain factor may be applied to the output current of the current buffer to provide a first baseline capacitance represented by the first sense capacitor and a second gain factor may be applied to a mirror of the output current of the same current buffer to provide a second baseline capacitance represented by the second sense capacitor. As such, a single current buffer may be used to provide a current to multiple current gain components to provide different currents to provide a different baseline capacitance for each sense channel (e.g., different input channels or channel inputs).

In some embodiments, such an architecture may result in lower noise in the RX sense channels. For example, since the positive terminal of the current buffer is coupled to the VY or positive terminal of an attenuator of the front end of each RX sense channel, the baseliner core may instead provide any noise charge to the sense capacitor (e.g.,. through the output current or baseliner current). Accordingly, signal noise in the VY or positive terminal of the attenuator of the front end does not result in added noise to the sense channel. Furthermore, any flicker noise from the baseliner core may correspond to a low frequency offset signal. The RX sense channel may receive such a noise signal and, in a particular phase of operation (e.g., when the VY input pulse is high), the noise signal may increase the RX output digital count while in the low input pulse for the VY input the baseliner core noise may reduce the RX output digital count. However, when taking the average between the two modes of operation (e.g., a high pulse and a low pulse of the VY input), the noise introduced by the baseliner core may be canceled. As such, any flicker noise of the baseliner core may be eliminated. Furthermore, the architecture may use a baseline capacitor to mimic a sense capacitor while the baseline resistor may provide matching of current transient profiles to prevent the RX sense channel from being saturated by the baseline current.

Figure 9:
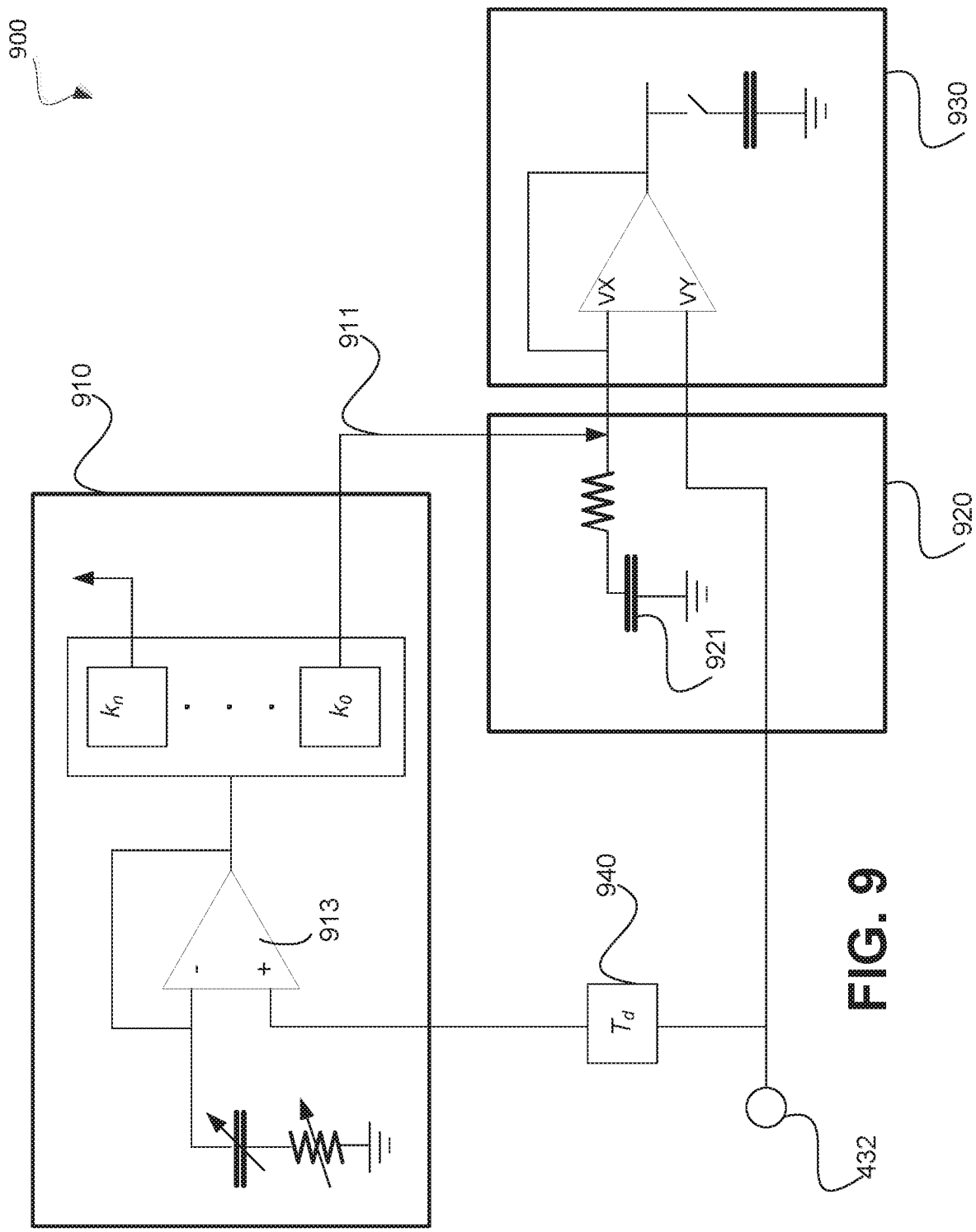
FIG. 9 is a block diagram of the capacitive baseliner with a programmable delay in accordance with some embodiments.

FIG. 9 is a block diagram of an example architecture 900 including the capacitive baseliner 910 with a programmable delay component. In general, the capacitive baseliner 910 may correspond to the capacitive baseliner as described in conjunction with FIGS. 1-4 and 6-8.

As shown in FIG. 9, the architecture 900 may include a capacitive baseliner 910, a baseline component 920, and a front end 930 of an RX sense channel. The positive terminal of the current buffer 913 of the capacitive baseliner 910 may be coupled to a programmable time delay component 940 that may be used to provide matching between the current transient profiles of the baseliner current 911 from the capacitive baseliner 910 and the current transient profile of the capacitance associated with the sense channel (e.g., corresponding to a sense capacitance represented by the sense capacitor 921). For example, the programmable time delay component may add a time delay to the positive terminal of the current buffer 913 based on the current transient profile associated with the sense channel. In some embodiments, the output of the baseline current to provide a baseline capacitance may be based on the programmable time delay.

In alternative embodiments, a programmable slew rate control component may be coupled to the positive terminal of the current buffer 913 to provide for slew rate control. The slew rate control may provide for improved control of the current transient profile as well. For example, the programmable slew rate on the positive terminal of the current buffer 913 (e.g., the VY input) may reduce the peak current to a level that provides for improved performance of the capacitive baseliner 910. For example, without the slew rate control, a fast edge on the VY input or positive input of the current buffer may result in a very large peak panel current that may be difficult for the capacitive baseliner to match as the baseliner current 911. In some embodiments, the slew rate may refer to the maximum rate of change of output voltage per unit of time.

Figure 10:
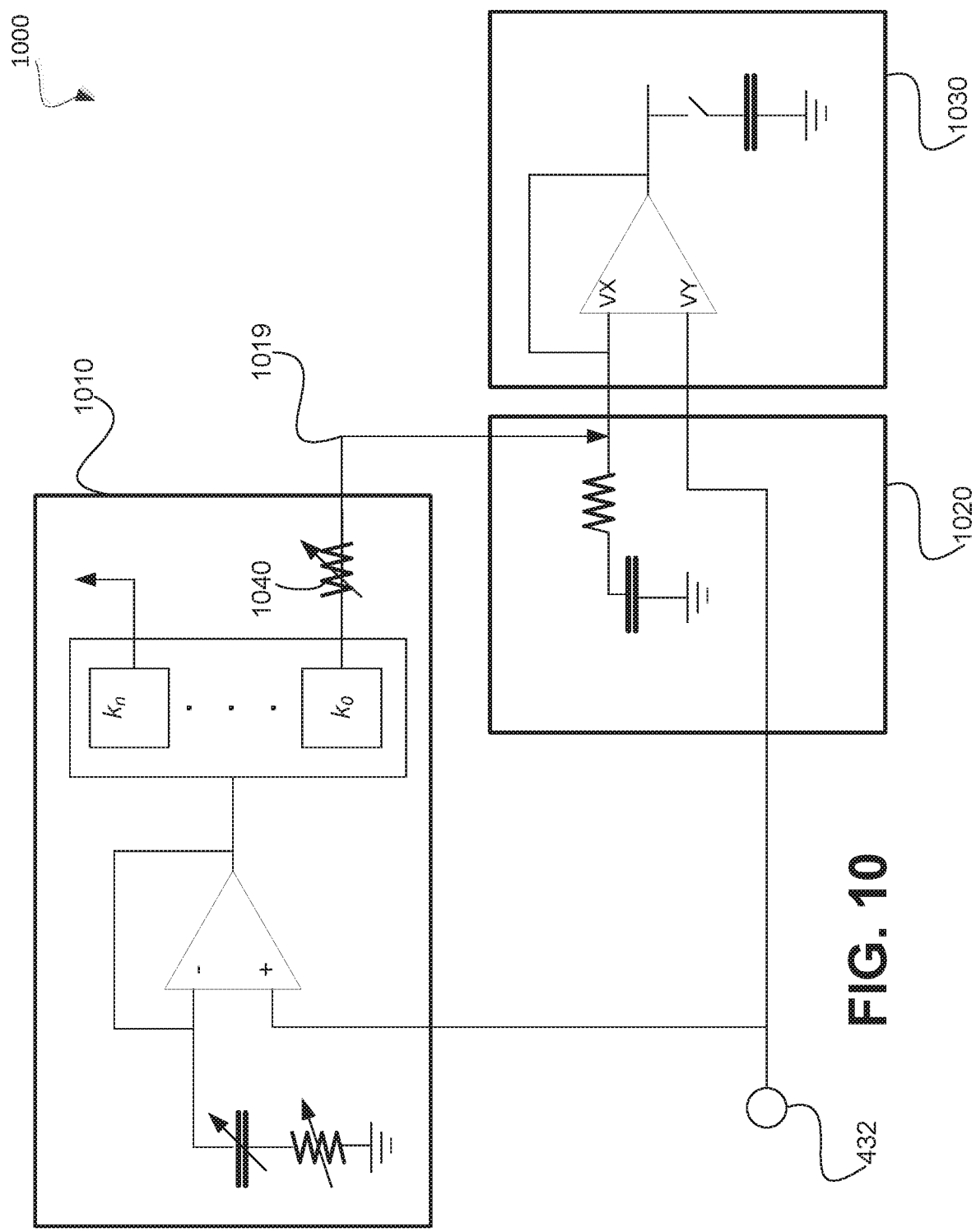
FIG. 10 is a block diagram of the capacitive baseliner with a programmable resistor for each gain stage in accordance with some embodiments.

FIG. 10 is a block diagram of an example architecture 1000 including the capacitive baseliner 1010 with a programmable resistor for each current gain component. In general, the capacitive baseliner 1010 may correspond to the capacitive baseliner as described in conjunction with FIGS. 1-4 and 6-8.

As shown in FIG. 10, the architecture 1000 may include the capacitive baseliner 1010, baseline component 1020, and the front end 1030 of an RX sense channel. The capacitive baseliner 1010 may include another programmable resistor 1040 that is used to match a current transient profile of the baseliner current 1019 with the current of the baseliner component 1020. In some embodiments, the programmable resistor 1040 may be provided to each sense channel. For example, each current gain component of the gain stage may be coupled to a separate programmable resistor 1040. Thus, each baseliner current may be used to provide a sense capacitance for each RX sense channel that may be varied based on the additional programmable resistor coupled to the corresponding current gain component.

Figure 11:
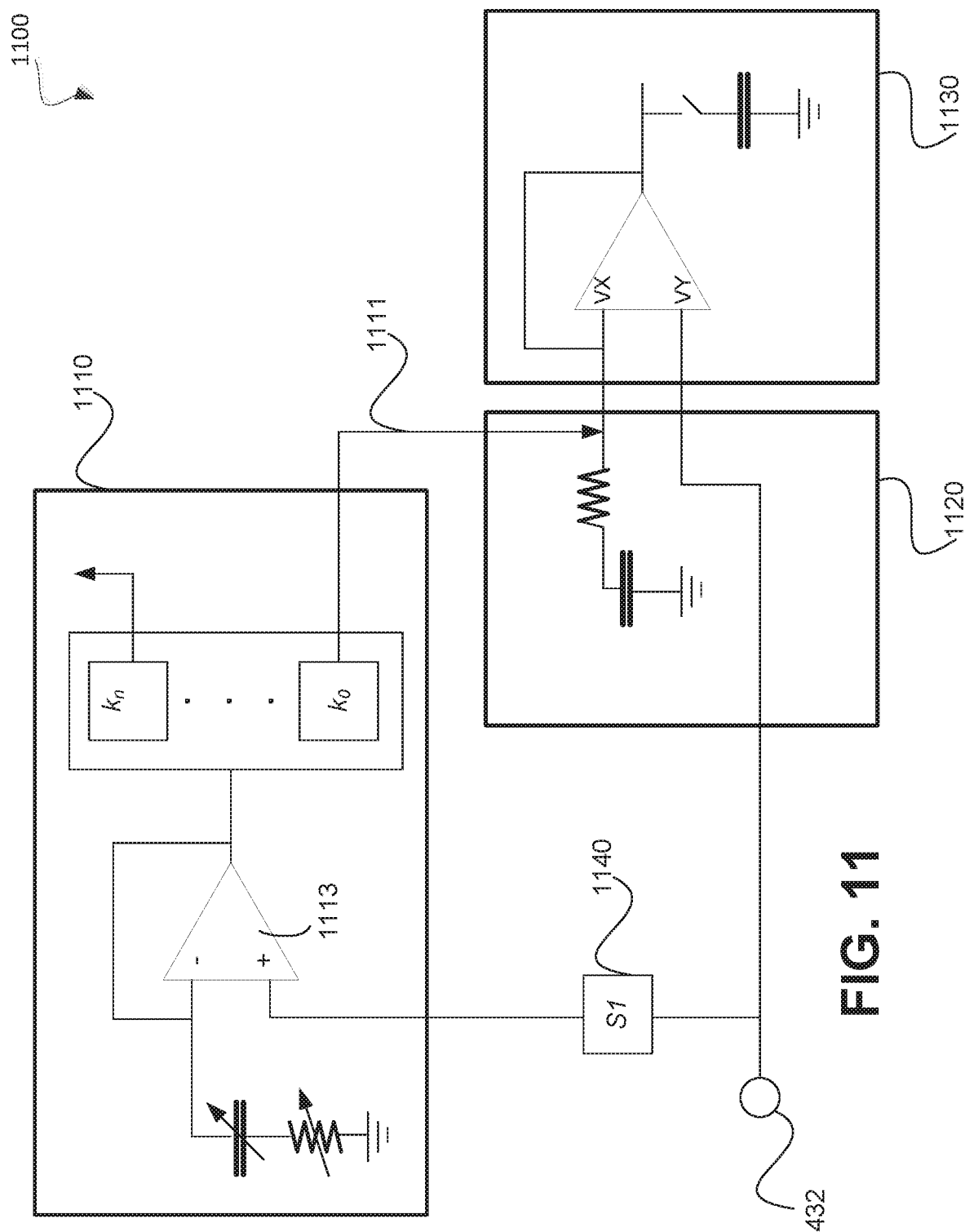
FIG. 11 is a block diagram of the capacitive baseliner with a sense element in accordance with some embodiments.

FIG. 11 is a block diagram of an example architecture 1100 including the capacitive baseliner 1110 with a sense element. In general, the capacitive baseliner 1110 may correspond to the capacitive baseliner as described in conjunction with FIGS. 1-4 and 6-8.

As shown in FIG. 11, the architecture 1100 may include a capacitive baseliner 1110, a baseline component 1120, and a front end 1130 of an RX sense channel. Furthermore, a sense element 1140 may be coupled to the positive terminal of the current buffer 1113 of the capacitive baseliner 1110 and the positive terminal (VY) of the attenuator of the front end 1130. In some embodiments, the sense element 1140 may be used to match the current transient profiles of the baseliner current outputted by the capacitive baseliner 1110 and a current or charge associated with a capacitive sense array including the RX sense channel. The sense element 1140 may sense when the negative terminal (e.g., VX) of the attenuator of the front end 1130 changes due to charge from the capacitive sense array (e.g., from an integration capacitor). The detected change may trigger the capacitive baseliner 1110 to deliver its baseliner current 1111 to the baseline component 1120. As a result, the capacitive baseliner 1110 may provide the baseliner current 1111 when a charge corresponding to a unit cell of the capacitive sense array associated with the sense channel changes at the negative terminal VX of the attenuator. In some embodiments, the sense element 1140 may include a comparator with an adjustable threshold that is used to determine when the negative terminal VX of the attenuator has changed in a particular direction by a threshold amount. In response to detecting that current at the negative terminal VX of the attenuator has changed by the threshold amount in the particular direction, then the capacitive baseliner may output the baseliner current 1111. Thus, the output of the baseliner current 1111 may be timed based on a change at an input of the attenuator corresponding to a charge associated with the capacitive sense array.

Figure 12:
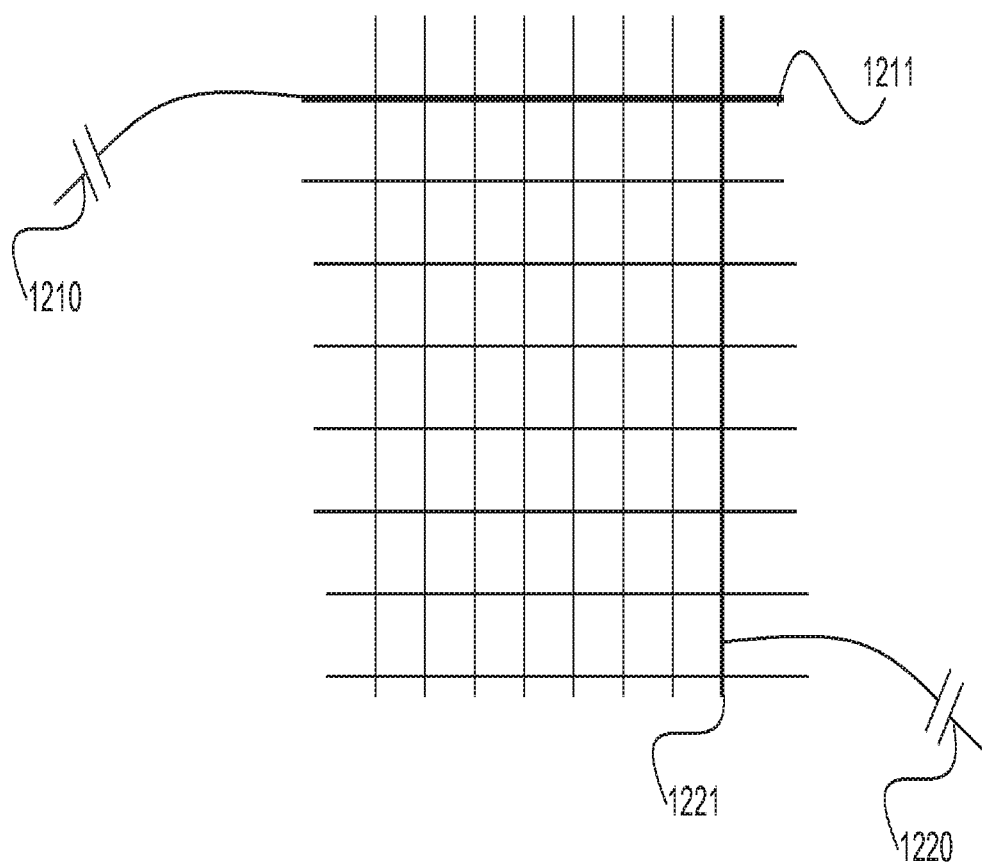
FIG. 12 illustrates a dummy electrode line to implement a capacitive baseliner in accordance with some embodiments of the present disclosure.

FIG. 12 illustrates a dummy electrode line to implement a capacitive baseliner. In general, the dummy electrode line may be used with a capacitive baseliner as described in conjunction with FIGS. 1-4 and 6-11.

As shown in FIG. 12, a dummy electrode line may be used to couple a baseline capacitor to a current buffer (e.g., a current buffer of a capacitive baseliner). For example, a baseline capacitor 1210 may be provided via a TX electrode 1211 of a capacitive sense array or a baseline capacitor 1220 may be provided via an RX electrode 1221 of the capacitive sense array. In some embodiments, the baseline capacitors 1210 and 1220 may be considered off-chip relative to the capacitive baseliner. Thus, the capacitive baseliner coupled to a dummy electrode line may not include the baseline capacitor. Instead, the capacitive baseliner may be coupled to the baseline capacitor via the dummy electrode line.

Figure 13:
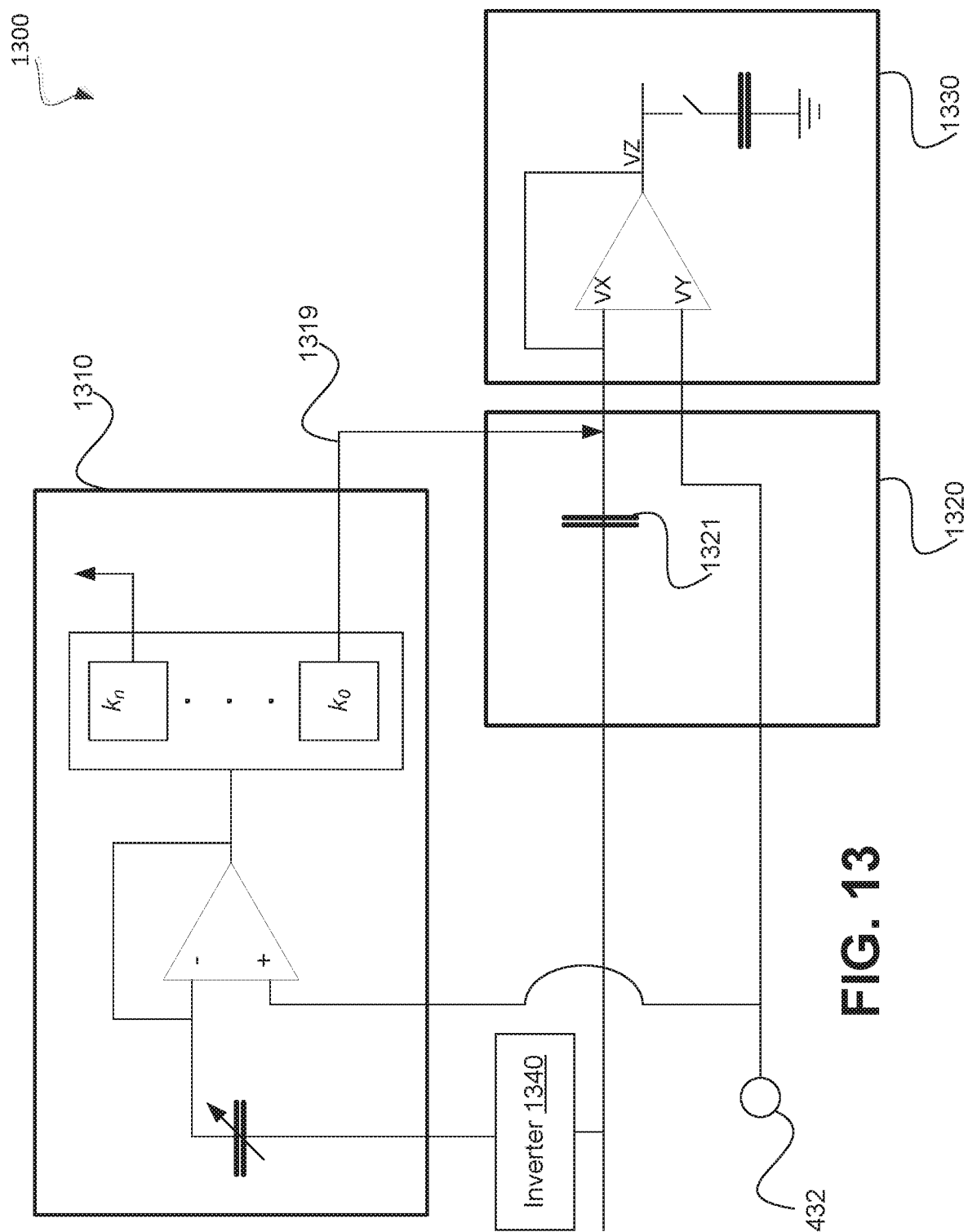
FIG. 13 is a block diagram of a capacitive baseliner in a mutual capacitance mode in accordance with some embodiments of the present disclosure.

FIG. 13 is a block diagram of an architecture 1300 including a capacitive baseliner for use in a mutual capacitance mode. As shown, the architecture 1300 may include a capacitive baseliner 1310 that generates a baseline current 1319, a baseline component 1320 that includes a mutual capacitor 1321, and a front end 1330 of an RX sense channel. The positive terminal of the current buffer of the capacitive baseliner 1310 may be coupled to the VY terminal of the attenuator of the front end 1330. In the mutual mode, the VY node may be tied to a constant reference voltage while the left side of Capacitor 1321 may be driven by the TX pulses. Furthermore, the baseline capacitor that is coupled to the negative terminal of the current buffer may further be coupled to an inverter 1340 which is also coupled to the mutual capacitor 1321. Furthermore, the mutual capacitor 1321 may be coupled to the VX input of the attenuator of the front end 1330. The baseline current 1319 may be used to provide a capacitance for the mutual capacitor 1321.

In some embodiments, the multiple TX electrodes may be coupled to provide charge to a single RX sense channel. Thus, several TX patterns may be used to generate a set of results that may be mathematically de-convolved to determine a capacitance at each of the TX lines. The net charge at the front end may be changed based on the TX patterns and the capacitive baseliner 1310 may similarly have its baseline capacitor and current gain components programmed so that the baseline current 1319 may match each TX pattern.

In the description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

For simplicity of explanation, the above methods are depicted and described as a series of acts. Although the operations of the methods herein are shown and described in a particular order, such order does not mean that such operations are necessarily performed in that order. Operations in accordance with this disclosure can occur in various orders and/or concurrently, and with other acts not presented and described herein. Certain operations may be performed, at least in part, concurrently with other operations and certain operations may be performed in an inverse order to that shown or described.

The methods described above regarding capacitance to code conversion can be implemented by the capacitive baseliner 120, which may be implemented in a capacitive touch screen controller. In one embodiment, the capacitive touch screen controller is the TrueTouch® capacitive touch-screen controller, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A capacitance-sensing circuit comprising:
   a channel input associated with measuring a capacitance of an element of a capacitive sense array; and
   a capacitive hardware baseliner coupled to the channel input, wherein the capacitive hardware baseliner comprises:
      a capacitor;
      a programmable baseline resistor; and
      a buffer with an input coupled to the programmable baseline resistor and an output coupled to the channel input, wherein the capacitive hardware baseliner generates a baseline current using the capacitor and the programmable baseline resistor to control a time constant of the capacitive hardware baseliner based on a time constant of the channel input associated with the measuring of the capacitance of the element of the capacitive sense array, wherein the capacitive hardware baseliner provides the baseline current at the channel input to provide a charge for a sense capacitor, wherein a change in the charge of the sense capacitor provided by the baseline current indicates a presence of a touch object proximate to the element.

2. The capacitance-sensing circuit of claim 1, wherein the channel input is a receive (RX) channel coupled to an RX electrode of the element, wherein the RX channel comprises a first input coupled to the RX electrode and an output of a current gain component, and wherein a second input of the RX channel is coupled to a same voltage source as the buffer.

3. The capacitance-sensing circuit of claim 1, the capacitive hardware baseliner further comprising:
- a current mirror coupled to the buffer; and
- a plurality of current gain components coupled to the current mirror, the current mirror to output a plurality of mirrored output currents to the plurality of current gain components.

4. The capacitance-sensing circuit of claim 3, further comprising:
- a second channel input to measure a capacitance of a second element of the capacitive sense array; and
- a second current gain component coupled to the current mirror to apply a second gain factor to one of the plurality of mirrored output currents to generate a second baseline current and to provide the second baseline current to the second channel input.

5. The capacitance-sensing circuit of claim 4, wherein the gain factor and the second gain factor are different gain factors.

6. The capacitance-sensing circuit of claim 1, wherein the capacitive hardware baseliner further comprises a current gain component coupled to the buffer.

7. The capacitance-sensing circuit of claim 1, wherein an input of the buffer is coupled to a slew rate control component.

8. The capacitance-sensing circuit of claim 1, wherein an input of the buffer is coupled to a programmable time delay component associated with matching a current transient profile of the baseline current with a current transient profile associated with the channel input.

9. A method comprising:
- generating, by a capacitive baseline circuit associated with a capacitive sense array, an output current by using a capacitor and a set resistance value of a programmable resistor to control a time constant of the capacitive baseline circuit based on a time constant at a channel input of the capacitive sense array;
- buffering, by a buffer coupled to the programmable resistor, an input channel associated with the capacitive sense array, the output current to generate a buffered current;
- applying a gain factor to the buffered current to generate a baseline current; and
- providing the baseline current at the channel input associated with the capacitive sense array to provide a charge for a sense capacitor, wherein a change in the charge of the sense capacitor that is provided by the baseline current indicates a presence of a touch object at the capacitive sense array.

10. The method of claim 9, further comprising:
- generating a plurality of mirrored output currents based on the output current;
- providing the plurality of mirrored output currents to a plurality of current gain components to generate a plurality of baseline currents; and
- providing the plurality of baseline currents to different input channels associated with the capacitive sense array.

11. The method of claim 10, further comprising applying a different gain factor to each of the plurality of mirrored output currents using the plurality of current gain components.

12. A capacitive sense array system comprising:
- a plurality of elements, each element comprising one or more electrodes;
- a plurality of channel inputs to measure capacitances of the plurality of elements; and
- a capacitive hardware baseliner coupled to the plurality of channel inputs, wherein the capacitive hardware baseliner comprises:
  - a capacitor;
  - a programmable baseline resistor; and
  - a buffer with an input coupled to the programmable baseline resistor and an output coupled to the one of the plurality of channel inputs, wherein the capacitive hardware baseliner generates a plurality of baseline currents using the capacitor and the programmable baseline resistor to control a time constant of the capacitive hardware baseliner based on a time constant of the channel inputs associated with the measuring of the capacitances of the elements of the capacitive sense array, wherein the capacitive hardware baseliner provides the plurality of baseline currents at the plurality of channel inputs to provide a charge for a plurality of sense capacitors, wherein a change in one of the plurality of sense capacitors that is provided with the baseline current indicates a presence of a touch object proximate to the corresponding elements.

13. The capacitive sense array system of claim 12, wherein the capacitive hardware baseliner further comprises a current gain component coupled to the buffer.

14. The capacitive sense array system of claim 13, wherein the plurality of channel inputs are receive (RX) channels coupled to RX electrodes of the plurality of elements, wherein one of the RX channels comprises a first input coupled to one of the RX electrodes and an output of the current gain component, and wherein a second input of the one of the RX channels is coupled to a same voltage source as the buffer.

15. The capacitive sense array system of claim 13, wherein the capacitive hardware baseliner further comprises:
- a current mirror coupled to the buffer; and
- a plurality of current gain components coupled to the current mirror, the current mirror to output a plurality of mirrored output currents to the plurality of current gain components.

16. The capacitive sense array system of claim 15, wherein each of the plurality of current gain components applies a different gain factor to a corresponding mirrored output current of the plurality of mirrored output currents to generate a corresponding baseline current of the plurality of baseline currents.

* * * * *